(12) United States Patent
Lu et al.

(10) Patent No.: US 9,674,371 B2
(45) Date of Patent: Jun. 6, 2017

(54) ONLINE UPGRADE PROCESSING METHOD, ASSOCIATED APPARATUS AND SYSTEM

(71) Applicant: Huawei Technologies Co., Ltd., Shenzhen, Guangdong (CN)

(72) Inventors: Jingshi Lu, Shenzhen (CN); Zhangqian Bao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 166 days.

(21) Appl. No.: 14/524,480

(22) Filed: Oct. 27, 2014

(65) Prior Publication Data

US 2015/0043388 A1 Feb. 12, 2015

Related U.S. Application Data

(63) Continuation of application No. PCT/CN2013/072782, filed on Mar. 18, 2013.

(30) Foreign Application Priority Data

Apr. 28, 2012 (CN) .......................... 2012 1 0132738

(51) Int. Cl.
*H04L 12/14* (2006.01)
*H04M 15/00* (2006.01)
(Continued)

(52) U.S. Cl.
CPC ........ *H04M 15/64* (2013.01); *H04L 12/1453* (2013.01); *H04L 12/1467* (2013.01);
(Continued)

(58) Field of Classification Search
CPC ............. H04L 12/1453; H04L 12/1467; H04L 41/082; H04M 15/64; H04M 15/70; H04M 17/02
See application file for complete search history.

(56) References Cited

U.S. PATENT DOCUMENTS

2008/0244552 A1 10/2008 Toeroe
2008/0319884 A1 12/2008 Yi et al.
(Continued)

FOREIGN PATENT DOCUMENTS

CN 1859136 A 11/2006
CN 1946226 A 4/2007
(Continued)

OTHER PUBLICATIONS

Anderson et al., "Providing Open Architecture High Availability Solutions, Revision 1.0," pp. 1-112, HA Forum, USA (Feb. 2011).
(Continued)

*Primary Examiner* — Andrew Lai
*Assistant Examiner* — M Mostazir Rahman
(74) *Attorney, Agent, or Firm* — Leydig, Voit & Mayer, Ltd.

(57) ABSTRACT

The embodiments of the present invention disclose an online upgrade processing method, an associated apparatus and a system. The online upgrade processing method includes: receiving online upgrade indication information, wherein the online upgrade indication information is used for indicating that a charging system enters into an online upgrade preparation phase; simulating charging environment of the charging system to generate a signal control environment with a charging function when the online upgrade indication information is received; and utilizing the signal control environment to replace the charging environment to accept service when the charging system enters into an online upgrading phase. The technical solution provided by the present invention can effectively solve a problem that it is required to bypass service during online upgrade.

18 Claims, 6 Drawing Sheets

(51) Int. Cl.
*H04L 12/24* (2006.01)
*H04M 17/02* (2006.01)

(52) U.S. Cl.
CPC ......... *H04L 41/082* (2013.01); *H04M 15/70* (2013.01); *H04M 17/02* (2013.01)

(56) References Cited

U.S. PATENT DOCUMENTS

| | | | |
|---|---|---|---|
| 2011/0066530 A1* | 3/2011 | Cai | H04L 12/1403 705/30 |
| 2012/0102482 A1 | 4/2012 | Wu et al. | |

FOREIGN PATENT DOCUMENTS

| | | |
|---|---|---|
| CN | 101616028 A | 12/2009 |
| CN | 101662390 A | 3/2010 |
| CN | 101826988 A | 9/2010 |
| CN | 101894052 A | 11/2010 |
| CN | 101996083 A | 3/2011 |
| CN | 102307113 A | 1/2012 |
| CN | 102710433 A | 10/2012 |
| EP | 2398186 A1 | 12/2011 |
| WO | WO 2004105354 A2 | 12/2004 |

OTHER PUBLICATIONS

Vaysburd, "Fault Tolerance in Three-Tier Applications: Focusing on the Database Tier," Proceedings of the 18$^{th}$ IEEE Symposium on Reliable Distributed Systems, pp. 322-327, Institute of Electrical and Electronics Engineers, New York, New York (Oct. 19-22, 1999).

Wolski et al., "Rolling Upgrades for Continuous Services," Service Availability: First International Service Availability Symposium (ISAS 2004), Lecture Notes in Computer Science, vol. 3335, pp. 175-189, Springer Publishing, Munich, Germany (2005).

\* cited by examiner

ONLINE UPGRADE PROCESSING METHOD, ASSOCIATED APPARATUS AND SYSTEM

CROSS-REFERENCE TO RELATED APPLICATIONS

This application is a continuation of International Patent Application No. PCT/CN2013/072782, filed on Mar. 18, 2013, which claims priority to Chinese Patent Application No. 201210132738.4, filed on Apr. 28, 2012, both of which are hereby incorporated by reference in their entireties.

TECHNICAL FIELD

The present invention relates to communications, and more particularly, to an online upgrade processing method, an associated apparatus and a system.

BACKGROUND

Figure 1:
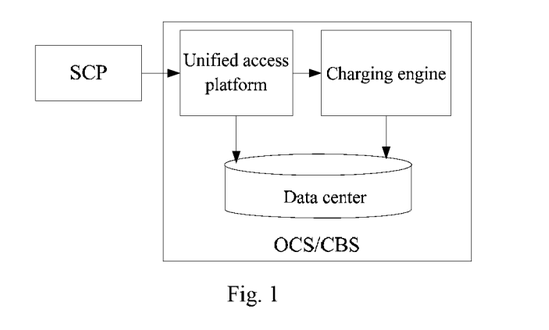
FIG. 1 is a schematic view of architecture of an existing OCS/CBS system.

At present, in a convergence billing system (CBS, Convergence Billing System) and an online charging system (OCS, Online Charge System), there exist abundant requirements for services, and a software is upgraded frequently. As shown in FIG. 1, the OCS/CBS system consists of a unified access platform, a charging engine and a data center, wherein the data center includes a physical data center, a memory data center, a data cache center and the like. A service control point (SCP, Service Control Point) interacts with the unified access platform of the OCS/CBS system through a diameter credit-control (DCC, Diameter Credit-Control) message interface.

An Operator is quite sensitive to service interruption time caused by upgrade, and proposes specific indexes. However, since the service interruption time is comprehensively determined by various objective factors such as a changed item during upgrade, skills of operating personnel, environment readiness and the like. At present, service is normally interrupted for several hours and still for tens of minutes even under an ideal condition.

Figure 2:
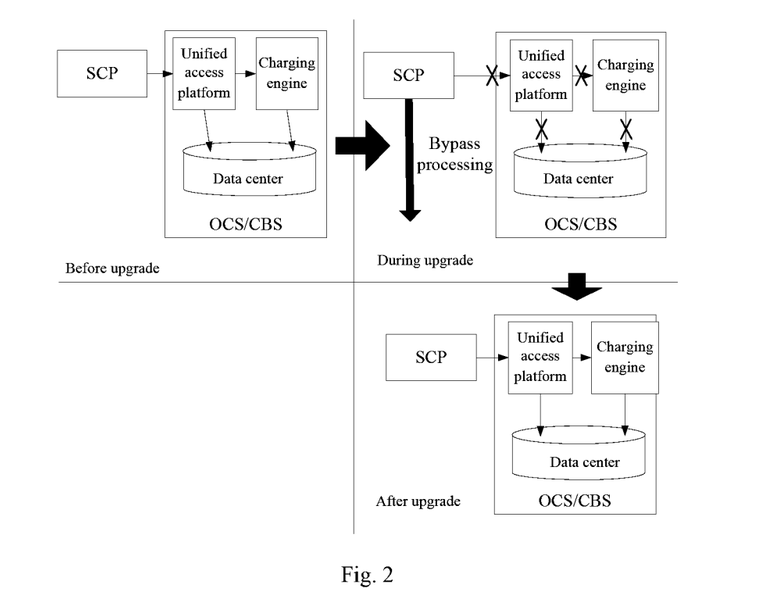
FIG. 2 is a schematic view of service processing solution of the existing OCS/CBS during software upgrade.

At present, when the OCS/CBS system is upgraded (for example, upgrade of an application program, upgrade of a data center, etc.), service is generally processed by adopting a bypass technology, wherein the bypass technology refers to that a front-end functional module of a functional module performs corresponding processing in accordance with a bypass requirement in the case that the functional module is disabled. FIG. 2 shows a schematic view of processing service by employing the bypass technology when the OCS/CBS system is upgrading. Before the OCS/CBS system is upgraded, when an SCP receives an online charging requirement, the SCP sends a DCC message to the unified access platform of the OCS/CBS system, and the charging engine performs charging according to the DCC message received by the unified access platform, wherein both the unified access platform and the charging engine can access the data center. When the OCS/CBS system is upgrading and the SCP receives an online charging requirement, the SCP sends a DCC message to the unified access platform of the OCS/CBS system. Since the OCS/CBS system is in the process of upgrading, the unified access platform and the charging engine of the OCS/CBS system stop running, and service processing is interrupted. Consequently, the unified access platform can not receive the DCC message sent by the SCP. When the SCP receives a timeout message returned by the OCS/CBS system, and if a current service is a voice call, the SCP performs bypass processing and records call information after the call is ended. After the upgrade is complete, the OCS/CBS system recovers normal operation. The OCS/CBS system collects the call information recorded by the SCP and performs charging by means of offline charging according to the call information.

The aforementioned solution may ensure that the upgrade of the OCS/CBS system is not perceivable by a user. However, since the SCP bypasses all calls in the aforementioned solution, a calling user can still make a call when current balance thereof is insufficient to pay for this call service. It is thus can be seen that the aforementioned solution has an arrearage risk for an operator, and more particularly, has a technical vulnerability of malicious arrearage. For example, when balance of a user is 0.1 yuan, which is insufficient to make an international call, a system will reject the user to make an international call during normal online charging, while in this solution, the SCP will bypass the international call when the OCS/CBS system is upgrading. On the other hand, the aforementioned solution requires a front-end network element (such as the SCP, a Gateway GPRS Support Node (GGSN, Gateway GPRS Support Node) and the like) of the OCS/CBS system to have bypass capability. If it is required that all network elements support bypass capability, modification and upgrade cost is quite high and it is not bearable by every operator and device manufacturer.

SUMMARY

The embodiments of the present invention provide an online upgrade processing method, an associated apparatus and a system, which are used for solving a problem that it is required to bypass service during online upgrade.

In order to solve the aforementioned technical problem, the embodiments of the present invention provide the following technical solutions.

An online upgrade processing method, includes:

receiving online upgrade indication information, wherein the online upgrade indication information is used for indicating that a charging system enters into an online upgrade preparation phase;

simulating charging environment of the charging system to generate a signal control environment with a charging function when the online upgrade indication information is received; and utilizing the signal control environment to replace the charging environment to accept service when the charging system enters into an online upgrading phase.

An online upgrade processing apparatus, includes:

a receiving unit, configured to receive online upgrade indication information, wherein the online upgrade indication information is used for indicating that a charging system enters into an online upgrade preparation phase;

a cloning unit, configured to simulate charging environment of the charging system to generate a signal control environment with a charging function; and a switching unit, configured to utilize the signal control environment to replace the charging environment to accept service when the charging system enters into an online upgrading phase.

A charging system, includes:

an online upgrade processing apparatus, configured to receive online upgrade indication information, wherein the online upgrade indication information is used for indicating that a charging system enters into an online upgrade preparation phase; to simulate charging environment of the charging system to generate a signal control environment with a charging function when the online upgrade indication information is received; and to utilize the signal control environment to replace the charging environment to accept service when the charging system enters into an online upgrading phase when the charging system enters into an online upgrading phase.

It can thus be seen from the foregoing that, in the embodiments of the present invention, the signal control environment with the charging environment function is generated by simulating the charging environment when an online upgrade is prepared, and the signal control environment is utilized to replace the charging environment to accept service in the online upgrade process. As a result, on one hand, the solution solves a dilemma that it is necessary to bypass service during the online upgrade, thereby avoiding an arrearage risk caused by bypassing the service; on the other hand, since the technical solution in the embodiment of the present invention does not need to modifying the architecture of the charging system or modifying an outer network element, thus having a characteristic of low modification cost.

BRIEF DESCRIPTION OF DRAWINGS

To illustrate technical solutions in the embodiments of the present invention or in the prior art more clearly, a brief introduction on the accompanying drawings which are needed in the description of the embodiments or the prior art is given below. Apparently, the accompanying drawings in the description below are merely some of the embodiments of the present invention, based on which other drawings can be obtained by the persons of ordinary skill in the art without any creative effort.

DESCRIPTION OF EMBODIMENTS

The embodiments of the present invention provide an online upgrade processing method, an associated device and a system.

In order to make the objectives, characteristics and advantages of the present invention more obvious and easier to be understood, the technical solutions in the embodiments of the present invention will be described clearly and fully hereinafter in conjunction with the accompanying drawings in the embodiments of the present invention. Apparently, the embodiments described below are merely a part, but not all, of the embodiments of the present invention. All of other embodiments, obtained by those skilled in the art based on the embodiments of the present invention without any inventive efforts, fall into the protection scope of the present invention.

Figure 3:
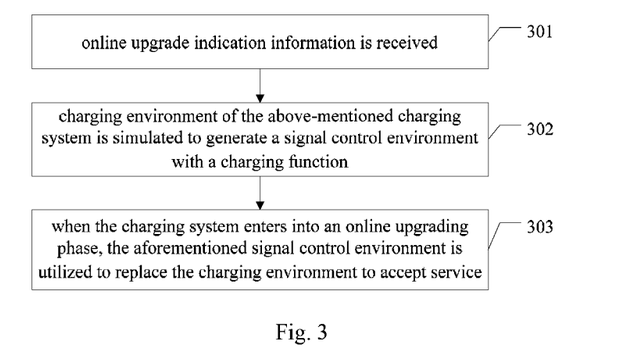
FIG. 3 is a flowchart of an embodiment of an online upgrade processing method provided by the present invention.

An online upgrade processing method in an embodiment of the present invention is described below. Referring to FIG. 3, the online upgrade processing method in the embodiment of the present invention includes the following steps.

301, online upgrade indication information is received.

When a charging system enters into an online upgrade preparation phase (for example, the charging system receives an online upgrade instruction or is downloading a software upgrade packet), the charging system or other system sends online upgrade indication information to an online upgrade processing apparatus, wherein the online upgrade indication information is used for indicating that the charging system currently enters into the online upgrade preparation phase, so that the online upgrade processing apparatus learns that the above-mentioned charging system enters into the online upgrade preparation phase upon receiving the online upgrade indication information.

302, charging environment of the above-mentioned charging system is simulated to generate a signal control environment with a charging function.

When the above-mentioned charging system enters into the online upgrade preparation phase, the online upgrade processing apparatus simulates the charging environment of the charging system to generate the signal control environment having the charging function. In the embodiment of the present invention, the charging environment of the charging system includes information and resources required to be used in the charging process, such as a charging user account, a unified access platform, a charging engine, a data center, a configuration file, an environment variable and the like. Since the signal control environment is generated by simulating the above-mentioned charging environment, the signal control environment includes the information and resources required to be used in the charging process likewise, which makes the signal control environment obtained by simulation has the charging function. A specific procedure for simulating the charging environment of the charging system to generate the signal control environment with the charging function may include the following steps: creating a signal control user account having a same permission as that of the charging user account, and copying a related file under the charging user account to the created signal control user account, wherein the related file includes an application software packet, a configuration file, an environment variable and the like. In order to avoid occurrence of a conflict between the generated signal control environment and the original charging environment, a configuration item probably subjected to a conflict is modified, for example, a value of "BASEKEY" of a shared memory is modified. In the embodiment of the present invention, an external port is not modified so as to ensure that a front-end network element of the charging system, such as an SCP, can utilize an original external port of the charging system to communicate with the charging system. A unified access platform process and a charging engine process identical to those in the charging environment are deployed in the signal control environment, and the signal control environment shares a data center of the charging environment. In the above-mentioned online upgrade preparation phase, the unified access platform and the charging engine of the charging environment run normally, and respective processes in the signal control environment are all not started.

The above-mentioned procedure for generating the signal control environment relates to a modification of a data access engine, and the modification of the data access engine may be realized through a transposition rule table and logic modification, which may specifically be realized in the following three manners: snapshot mirror, signal control increment and signal control replacement, wherein the snapshot mirror refers to obtain, by snapshotting based on an original table in the data center, a mirror table which has completely identical table structure, index, data and the like as that of the original table. When charging is performed in the signal control environment, and if the above-mentioned original table needs to be accessed in the charging process, processing of access to the above-mentioned original table is automatically transposed to access to the mirror table of the original table. Different transposition rules may be adopted for different tables in the data center. The signal control increment refers to designing a signal control increment table which has same structure and index as the original table. When charging is performed in the signal control environment and if it is necessary to change data of the aforementioned original table in the charging process, changed data is stored in the aforementioned signal control increment table in an incremental manner; and when it is necessary to read data of the original table, the original table and the signal control increment table are read respectively, and data in the original table and the changed data in the signal control increment table are merged and processed to obtain data of the original table after changed. The signal control replacement refers to designing a signal control replacement table which has same structure and index as the original table. When charging is performed in the signal control environment and if it is necessary to change data of the aforementioned original table in the charging process, changed data is stored in the signal control replacement table in a replacement manner, and when it is necessary to read data of the original table, the signal control replacement table is accessed preferentially, and if the data in the signal control replacement table can not be accessed, the original table is accessed. For example, it is supposed that the data center of the charging environment includes three original tables, whose table names are table_a, table_b and table_c, respectively, and an implementation manner for modifying the data access engine is shown in table 1.

TABLE 1

| Type of data source | Table name | Transposition rule |
|---|---|---|
| DB table | table_a | snapshot mirror |
| DB table | table_b | signal control increment |
| DB table | table_c | signal control replacement |

A transposition rule for the snapshot mirror is as follows.

It is supposed that a field of the table table_a table includes x1 int and x2 char(32), and includes the following two records:
111 ABC
123 XYZ Then a table table_a_SnapShot is obtained in the signal control environment by snapshotting based on a table creation statement of the table table_a, of which table field also includes x1 int and x2 char(32), and includes the following two records likewise:
111 ABC
123 XYZ In the signal control environment, when a statement "select XX from table_a" is parsed, it is automatically transposed into a statement "select XX from table_a_SnapShot"; when a statement "insert into table_a" is parsed, it is automatically transposed into a statement "insert into table_a_SnapShot"; and when a statement "update/delete table_a" is parsed, it is automatically transposed into a statement "update/delete table_a_SnapShot".

The transposition rule of the snapshot mirror is suitable for a scenario that the original table of the data center is subjected to an incompatible upgrade.

A transposition rule for the signal control increment is as follows.

It is supposed that a field of the table table_b includes x1 int and x2 char(32), and includes the following two records:
111 ABC
123 XYZ A table table_b_increment is created in the signal control environment based on a table creation statement of the table table_b, of which a table field also includes x1 int and x2 char(32), and an initial state of the table table_b is blank.

When a statement "update table_b set x1=x1+50 where x2='ABC'" is parsed in the signal control environment, it is transposed into the following statements:

```
If select count(*)>0 from table_b_increment where x2='ABC'
Then update table_b_increment set x1=x1+50 where x2='ABC'
else
insert into table_b_increment(x1, x2) value (50, 'ABC');
```

Meaning of the aforementioned sentences is as follows: when an increment command to the original table table_b is parsed in the signal control environment, it is checked whether there exists a record satisfying a condition (namely x2='ABC') in the table table_b_increment, and if there does exist a record satisfying the condition, incremental update is directly performed on the table table_b_increment; otherwise, a new record is inserted into the table table_b_increment.

When a statement "select x1 from table_b where x2='ABC'" is parsed, it is transposed into the following statements:
Select a.x1+b.x1 from table_b a, table_b_increment b where a.x2=b.x2 and a.x2='ABC';

Meaning of the aforementioned sentences is as follows: when a statement for querying data recorded in the table_b is parsed in the signal control environment, tables table_b and table_b_increment are queried respectively according to a condition (namely x2='ABC') and queried results are merged.

When a statement "insert into table_b (x1, x2) value (50, 'ABC')" is parsed, it is transposed into insert into a statement "table_b_increment(x1,x2) value (50, 'ABC')";

Meaning of the aforementioned sentence is as follows: when a statement for inserting data into the table_b is parsed in the signal control environment, the data is inserted into the table_a_increment.

The transposition rule of the signal control increment is suitable for a dynamic information table of balance and the like.

A transposition rule for the signal control replacement is as follows.

It is supposed that a field of the table table_c includes x1 int and x2 char(32), and includes the following two records:

111 ABC
123 XYZ

A table table_c_replace is created in the signal control environment based on a table creation statement of the table table_c, of which a table field also includes x1 int and x2 char(32), and initial state of the table table_c is blank.

When a statement "select XX from table_c" is parsed in the signal control environment, it is firstly transposed into a statement "select XX from table_c_replace", and if there does not exist such record, it is then processed in accordance with the parsed statement "select XX from table_c".

When a statement "insert into table_c" is parsed, it is transposed into a statement "insert into table_c_replace".

When a statement "update table_c" is parsed, it is transposed into a statement "update table_c_replace".

When a statement "delete table_c" is parsed, corresponding record of the table_c is inserted into the table_c_replace, and a special value identifier is modified to be blank (such as NULL).

The transposition rule of the signal control replacement is suitable for an information table of user state and the like.

In the embodiment of the present invention, a signal control system where the signal control environment is located in is related to and isolated from a charging system where the charging environment is located in.

The signal control system being related to the charging system refers to that, the signal control environment is generated by simulating the charging environment, and an application software packet in the signal control environment is completely the same as that in the charging environment; and the data center of the charging environment is still shared.

The signal control system being isolated from the charging system refers to that, it is guaranteed that independent signal control environment is isolated from an application of the charging environment, and there does not exist coexistence conflict of key resources; by modifying the data access engine, it is enabled that the signal control environment performs only virtual operation (namely, all modification operations such as insert, update, delete and the like are shielded, and only read operation is permitted) on the data center of the charging system in principle, and for an incompatible change of a table structure involved in an upgrade, the original table is snapshotted into the signal control mirror table, and the charging engine realizes transposition of an access to the original table into an access to the signal control mirror table; and for an update operation to a few key dynamic data (such as balance) of the charging system, changed data is transposed into incremental data or into temporary data stored in the signal control increment table, and when data reading operation is performed, data is read from both the original table and the signal control increment table, and the read data is then merged and processed.

303, when the charging system enters into an online upgrading phase, the aforementioned signal control environment is utilized to replace the charging environment to accept service.

The online upgrade processing apparatus may employ the aforementioned signal control environment to replace the aforementioned charging environment to accept service by specifically adopting the following steps: stopping a unified access platform process and a charging engine process of the charging environment, and starting a unified access platform process and a charging engine process of the signal control environment at a same moment. From the stop of the charging engine process to the start of the signal control environment process, the charging system enters into a real-time signal control phase from an online charging phase, and the signal control environment replaces the charging environment to accept service.

Further, after the online upgrade of the charging system is terminated, the online upgrade processing apparatus recovers the aforementioned charging environment to accept service, which specifically includes the following steps: stopping the unified access platform process and the charging engine process of the signal control environment, and restarting the unified access platform process and the charging engine process of the charging environment. Further, if a charging debt record file is generated in the real-time signal control phase, the aforementioned charging environment performs offline charging to the charging debt record file generated in the real-time signal control phase. Further, the charging system may also clear the signal control environment (for example, delete an application software packet, a temporary table, a signal control user account and the like in the signal control environment) after the aforementioned charging environment is recovered to accept service; and if the charging system clears the signal control environment after the aforementioned charging environment is recovered to accept service, the charging system needs to re-simulate the charging environment to generate a signal control environment during next upgrade.

The technical solution provided in the embodiment of the present invention is applicable to, but not limited to, OCS, CBS and any charging field (such as charging of public resources of a power grid and the like) permitting real-time signal control, and no limitation is set herein.

It can thus be seen that, in the embodiment of the present invention, the signal control environment with the charging environment function is generated by simulating the charging environment when an online upgrade is prepared, and the signal control environment is utilized to replace the charging environment to accept service in the online upgrade process. As a result, on one hand, the solution solves a dilemma that it is necessary to bypass service during the online upgrade, thereby avoiding an arrearage risk caused by bypassing the service; on the other hand, since the technical solution in the embodiment of the present invention does not need to modifying the architecture of the charging system or modifying an outer network element, thus having a characteristic of low modification cost.

Figure 4:
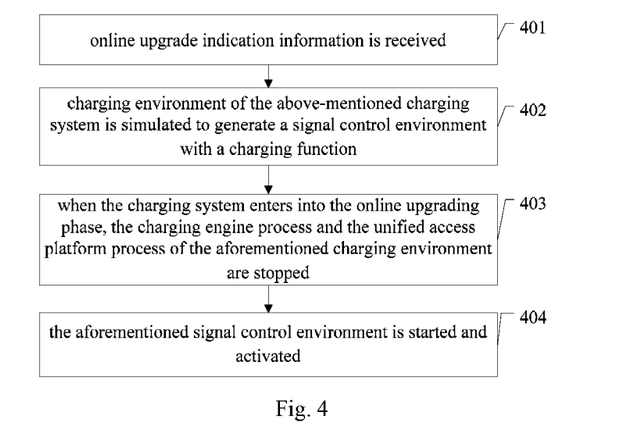
FIG. 4 is a flowchart of another embodiment of the online upgrade processing method provided by the present invention.

In order for the technical solution of the present invention to be better understood, an online upgrade processing method in the embodiment of the present invention is described hereinafter in detail. As shown in FIG. 4, the online upgrade processing method in the embodiment of the present invention includes the following steps.

Steps 401 and 402 are included, wherein the steps 401 and 402 are similar to the description on the steps 301 and 302 in the embodiment shown in FIG. 3, and will not be described redundantly herein.

403, when the charging system enters into the online upgrading phase, the charging engine process and the unified access platform process of the aforementioned charging environment are stopped.

When the charging system enters into the online upgrading phase, the online upgrade processing apparatus stops the charging engine process and the unified access platform process of the aforementioned charging environment, namely, the charging engine process and the unified access platform process of the aforementioned charging environment are enabled to stop running, and at this moment, the aforementioned charging environment can not accept service.

404, the aforementioned signal control environment is started and activated.

The online upgrade processing apparatus starts and activates the aforementioned signal control environment, wherein the term "activate" refers to switch the aforementioned signal control environment from an IDLE state to an ACTIVE state, so that the aforementioned signal control environment is in a state of accepting service, and at this moment, the charging system switches from an online charging phase to a real-time signal control phase.

A charging system is updated along with development of service, and correspondingly, a version of a charging environment is also updated. Therefore, in order to ensure that a version of the aforementioned signal control environment is in accordance with a version of current charging environment, before the step 401 of the embodiment of the present invention is performed, if presence of the aforementioned signal control environment is detected, it is detected whether the version of the signal control environment is in accordance with the version of the current charging environment; if the version of the signal control environment is in accordance with the version of the current charging environment, the steps after the step 401 may be executed with the step 401 being skipped so as to reduce procedure; otherwise, it is necessary to execute the step 401, and the updated charging environment is re-simulated to generate a new signal control environment for replacing the original signal control environment. Certainly, in the embodiment of the present invention, after the online upgrade is terminated, the charging engine process of the aforementioned charging environment may also be restarted, and a signal control environment process may be stopped, thus recovering to the online charging phase, namely, the aforementioned charging environment is recovered to accept service. Further, if a charging debt record file is generated in the real-time signal control phase, offline charging is firstly performed to the generated charging debt record file before the signal control environment is cleared. Further, the charging system may also clear the signal control environment (for example, delete an application software packet, a temporary table, a user and the like of the signal control environment) after the aforementioned charging environment is recovered to accept service; and if the charging system clears the signal control environment after the aforementioned charging environment is recovered to accept service, the charging system needs to re-simulate the charging environment to generate a signal control environment during next upgrade.

The technical solution provided by the embodiment of the present invention is applicable to, but not limited to, OCS, CBS and any charging field (such as charging of public resources of a power grid and the like) permitting real-time signal control, and no limitation is set herein.

It can thus be seen that, in the embodiment of the present invention, the signal control environment with the charging environment function is generated by simulating the charging environment when an online upgrade is prepared, and the signal control environment is utilized to replace the charging environment to accept service in the online upgrade process. As a result, on one hand, the solution solves a dilemma that it is necessary to bypass service during the online upgrade, thereby avoiding an arrearage risk caused by bypassing the service; on the other hand, since the technical solution in the embodiment of the present invention does not need to modifying the architecture of the charging system or modifying an outer network element, thus having a characteristic of low modification cost.

Since start and stop of a process need to occupy time, in order to reduce influence of start and stop of a process on service interruption, another online upgrade processing method provided by an embodiment of the present invention is described below. By referring to FIG. 5, the online upgrade processing method in the embodiment of the present invention includes the following steps.

Figure 5:
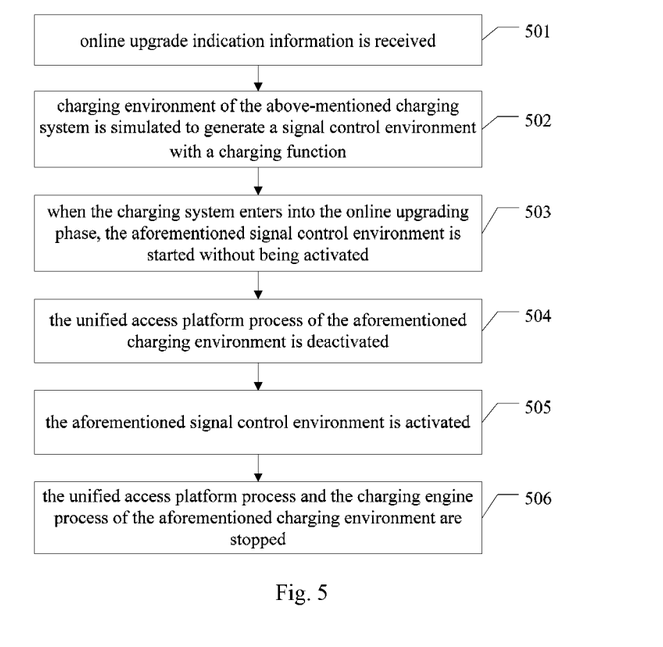
FIG. 5 is a flowchart of yet another embodiment of the online upgrade processing method provided by the present invention.

Steps 501 and 502 are included, wherein the steps 501 and 502 are similar to the description on the steps 301 and 302 of the embodiment shown in FIG. 3, and will not be described redundantly herein.

503, when the charging system enters into the online upgrading phase, the aforementioned signal control environment is started without being activated.

The online upgrade processing apparatus starts the aforementioned signal control environment but does not activate the aforementioned signal control environment, that is, the online upgrade processing apparatus starts an application process of the aforementioned signal control environment, such as the unified access platform process and the charging engine process, and at a same moment, the online upgrade processing apparatus keeps the unified access platform process of the aforementioned signal control environment in an IDLE state, so that the aforementioned signal control environment is temporarily in a service unacceptable state.

In an application scenario, the aforementioned starting without activating the aforementioned signal control environment may be implemented in the following form. For example, the charging engine process of the aforementioned signal control environment is firstly started and activated, and since the unified access platform process of the aforementioned signal control environment is not started at this moment, there is no request that will trigger the charging engine process and thus the charging engine process is temporarily idle; and then the unified access platform process of the signal control environment is started without being activated, wherein the unified access platform process being not activated refers to keep the unified access platform process in an IDLE state, and since the unified access platform process of the signal control environment is kept in the IDLE state, the unified access platform process is in a service unacceptable state. Certainly, as an alternative, the unified access platform process may be firstly started without being activated, and the charging engine process is then started; or, the charging engine process and the unified access platform process are simultaneously started, but the unified access platform process is not activated. No limitation is set herein.

504, the unified access platform process of the aforementioned charging environment is deactivated.

After performing the step 503, the online upgrade processing apparatus deactivates the unified access platform process of the aforementioned charging environment, namely, the unified access platform process of the aforementioned charging environment is switched from the ACTIVE state to the IDLE state, so that the unified access platform process of the aforementioned charging environment is changed from a service acceptable state to a service unacceptable state.

505, the aforementioned signal control environment is activated.

After performing the step 503, the online upgrade processing apparatus activates the aforementioned signal control environment, namely, to enable the unified access platform process of the aforementioned signal control environment to switch from the IDLE state to the ACTIVE state, so that the aforementioned signal control environment is changed from a service unacceptable state to a service acceptable state.

In the embodiment of the present invention, in order to realize seamless switch so as to ensure that the external service processing of the charging system is not interrupted at all, a time interval between the step 505 and the step 504 is as short as possible.

506, the unified access platform process and the charging engine process of the aforementioned charging environment are stopped.

At this moment, a software packet can be upgraded and updated.

In the embodiment of the present invention, an external port is not changed, thus processing of the charging system is coherent. As a result, an outer network element does not perceive a change of the system switching between the real-time signal control phase and the online charging phase, wherein the aforementioned real-time signal control phase refers to a phase in which service is accepted by the signal control system, and the aforementioned online charging phase refers to a phase in which service is accepted by the charging system.

A charging system is updated along with development of service, and correspondingly, a version of a charging environment is also updated. Therefore, in order to ensure that a version of the aforementioned signal control environment is in accordance with a version of current charging environment, before the step 501 of the embodiment of the present invention is performed, if presence of the aforementioned signal control environment is detected, it is detected whether the version of the signal control environment is in accordance with the version of the current charging environment; if the version of the signal control environment is in accordance with the version of the current charging environment, the steps after the step 501 may be executed with the step 501 being skipped so as to reduce procedure; otherwise, it is necessary to execute the step 501, and the updated charging environment is re-simulated to generate a new signal control environment for replacing the original signal control environment. Certainly, in the embodiment of the present invention, after the online upgrade is terminated, the charging engine process of the aforementioned charging environment may also be restarted, and a signal control environment process may be stopped, thus recovering to the online charging phase, namely, the aforementioned charging environment is recovered to accept service. Further, if a charging debt record file is generated in the real-time signal control phase, offline charging is performed to the generated charging debt record file before the signal control environment is cleared. Further, the charging system may also clear the signal control environment (for example, delete an application software packet, a temporary table, a user and the like of the signal control environment) after the aforementioned charging environment is recovered to accept service; and if the charging system clears the signal control environment after the aforementioned charging environment is recovered to accept service, the charging system needs to re-simulate the charging environment to generate a signal control environment during next upgrade.

The technical solution provided by the embodiment of the present invention is applicable to, but not limited to, OCS, CBS and any charging field (such as charging of public resources of a power grid and the like) permitting real-time signal control, and no limitation is set herein.

It can thus be seen that, in the embodiment of the present invention, the signal control environment with the charging environment function is generated by simulating the charging environment when an online upgrade is prepared, and the signal control environment is utilized to replace the charging environment to accept service in the online upgrade process. As a result, on one hand, the solution solves a dilemma that it is necessary to bypass service during the online upgrade, thereby avoiding an arrearage risk caused by bypassing the service; on the other hand, since the technical solution in the embodiment of the present invention does not need to modifying the architecture of the charging system or modifying an outer network element, thus having a characteristic of low modification cost. Further, a manner of starting and then activating is adopted in the embodiment of the present invention, namely, the signal control environment is firstly started without being activated, and the signal control environment is activated after the unified access platform process and the charging engine process of the charging environment are deactivated, so that the signal control environment replaces the charging environment to accept service. Since the signal control environment has already been started before the unified access platform process and the charging engine process of the charging environment are deactivated, service interruption, caused by waiting for start of the signal control environment when the unified access platform process and the charging engine process of the charging environment have already been stopped while the signal control environment is not started, can be avoided, thereby realizing seamless switch between the signal control environment and the charging environment.

Figure 6:
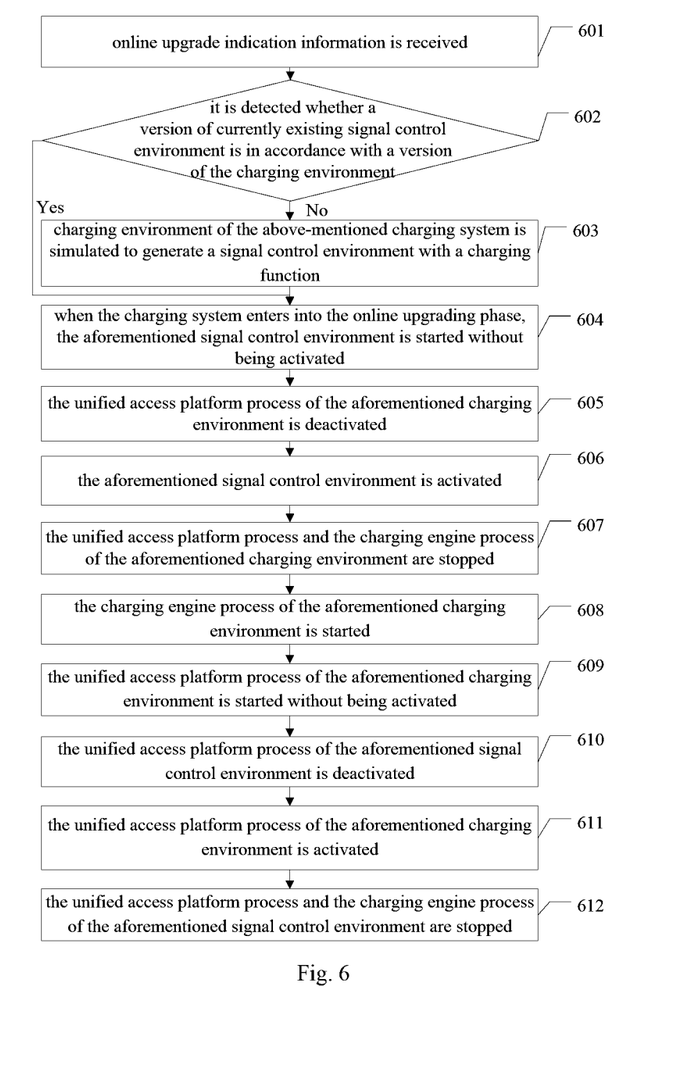
FIG. 6 is a flowchart of still yet another embodiment of the online upgrade processing method provided by the present invention.

In order for the technical solution of the present invention to be better understood, the online upgrade processing method provided by the embodiment of the present invention is described hereinafter in further detail. In the embodiment of the present invention, the online charging phase is recovered after the upgrade is terminated. Referring to FIG. 6, the online upgrade processing method in the embodiment of the present invention includes the following steps.

601, online upgrade indication information is received.

When a charging system enters into an online upgrade preparation phase (for example, the charging system receives an online upgrade instruction or is downloading a software upgrade packet), the charging system or other system sends online upgrade indication information to an online upgrade processing apparatus, wherein the aforementioned online upgrade indication information is used for indicating that the above-mentioned charging system currently enters into the online upgrade preparation phase, so that the online upgrade processing apparatus learns that the above-mentioned charging system enters into the online upgrade preparation phase upon receiving the online upgrade indication information.

602, it is detected whether a version of currently existing signal control environment is in accordance with a version of the charging environment.

The online upgrade processing apparatus detects whether the version of the currently existing signal control environment of the charging system is in accordance with the version of the charging environment, and if the version of the currently existing signal control environment of the charging system is in accordance with the version of the charging environment, step 603 is executed; otherwise, step 602 is executed.

Steps 603-607 may be referred to the description on the steps 502-506 of the embodiment shown in FIG. 5, which will not be described redundantly herein.

608, the charging engine process of the aforementioned charging environment is started.

After the aforementioned upgrade is terminated, the online upgrade processing apparatus starts the charging engine process of the aforementioned charging environment and prepares to recover the charging system to the online charging phase.

609, the unified access platform process of the aforementioned charging environment is started without being activated.

After the step 608 is executed, the online upgrade processing apparatus starts but does not activate the unified access platform process of the aforementioned charging environment, namely, the online upgrade processing apparatus starts the unified access platform process of the aforementioned charging environment and keeps the unified access platform process of the aforementioned signal control environment in an IDLE state, so that the unified access platform process of the aforementioned charging environment is in a service unacceptable state.

610, the unified access platform process of the aforementioned signal control environment is deactivated.

After the step 609 is executed, the online upgrade processing apparatus deactivates the unified access platform process of the aforementioned signal control environment, namely, to enable the unified access platform process of the aforementioned signal control environment to switch from an ACTIVE state to an IDLE state, so that the unified access platform process of the aforementioned signal control environment is changed from a service acceptable state to a service unacceptable state.

611, the unified access platform process of the aforementioned charging environment is activated.

The online upgrade processing apparatus activates the unified access platform process of the aforementioned charging environment, namely, to enable the unified access platform process of the aforementioned charging environment to switch from an IDLE state to an ACTIVE state, so that the aforementioned charging environment is changed from a service unacceptable state to a service acceptable state. In the embodiment of the present invention, in order to realize seamless switch so that an outer network element and a user do not perceive the whole upgrade process, a time interval between the step 611 and the step 610 is as short as possible.

612, the unified access platform process and the charging engine process of the aforementioned signal control environment are stopped.

The online upgrade processing apparatus stops the unified access platform process and the charging engine process of the aforementioned signal control environment, so as to end processing flow of online charging of this upgrade. The steps 601 to 612 in the embodiment of the present invention are re-executed during next upgrade.

Further, the online upgrade processing apparatus clears the signal control environment (for example, deletes a software packet, a temporary table, a user and the like of the signal control environment) after stopping the unified access platform process and the charging engine process of the aforementioned signal control environment. If a charging debt record file is generated at the real-time signal control phase, offline charging is firstly performed to the generated charging debt record file before the signal control environment is cleared.

The technical solution provided by the embodiment of the present invention is applicable to, but not limited to, OCS, CBS and any charging field (such as charging of public resources of a power grid and the like) permitting real-time signal control, and no limitation is set herein.

It can thus be seen that, in the embodiment of the present invention, the signal control environment with the charging environment function is generated by simulating the charging environment when an online upgrade is prepared, and the signal control environment is utilized to replace the charging environment to accept service in the online upgrade process. As a result, on one hand, the solution solves a dilemma that it is necessary to bypass service during the online upgrade, thereby avoiding an arrearage risk caused by bypassing the service; on the other hand, since the technical solution in the embodiment of the present invention does not need to modifying the architecture of the charging system or modifying an outer network element, thus having a characteristic of low modification cost. In addition, in the embodiment of the present invention, if it is found there exists a signal control environment before a new signal control environment is generated, and a version of the existing signal control environment is in accordance with a version of the charging environment, the existing signal control environment is reused instead of generating the new signal control environment, thus there is no need to generate a new signal control environment and system resources can be effectively saved.

The online upgrade processing method in the aforementioned embodiment is described below with a specific application scenario. It is supposed there exists three tenants MVNO1, MVNO2 and MVNO3 under a certain operator, and the three tenants share a charging system (a same charging host, in which application softwares and data tables of the three tenants are not isolated from each other). The MVNO1 has a new demand in terms of upgrading an application software packet, and an incompatible change of a tariff table Table_tariff occurs. A structure of an original table, Table_tariff, is as follows:

```
{
Tariffid int,        //tariff ID
Ratio int,           //rate
RatioMeasureID      // measurement of rate, such as cent, li and the like.
}
```

For the MVNO1, range of rate stored in an int type is too small, and it is necessary to extend the field to a long type.

In an upgrade preparation phase, a charging environment of a charging system is simulated to generate a signal control environment with a charging function, of which a specific procedure is as follows: a signal control user account having a same permission as a charging user account is created, and a related file (such as an application software packet, a configuration file, an environment variable and the like) under the charging user account is copied to the created signal control user account. In order to avoid occurrence of a conflict between the generated signal control environment and the original charging environment, a configuration item probably subjected to a conflict is modified (for example, a value of "BASEKEY" of a shared memory is modified), and an external port is not modified so as to ensure that a front-end network element of the charging system, such as an SCP, can utilize an original external port of the charging system to communicate with the charging system. A unified access platform process and a charging engine process identical to those in the charging environment are deployed in the signal control environment, and the signal control environment shares a data center of the charging environment. In the above-mentioned online upgrade preparation phase, the unified access platform and the charging engine of the charging environment run normally, and respective processes in the signal control environment are all not started. A transposition rule of a Table_tariff table is configured as snapshot mirror, based on which Table_tariff_SnapShot is obtained by snapshotting (which may also be performed when the first service is processed in the signal control environment) during cloning. Table structure, index, data and the like of the Table_tariff_SnapShot are the same as that of the table Table_tariff.

In a upgrading phase, a charging engine process of the signal control environment is firstly started (since a corresponding unified access platform process is not started, there is no request that will trigger the charging engine process, and the charging engine process is temporarily idle), and then a unified access platform process of the signal control environment is started without being activated. After the aforementioned start is completed, the unified access platform process of the charging environment is deactivated, so that the unified access platform process of the charging environment is switched from an ACTIVE state to an IDLE state (namely, changing from a service acceptable state to a service unacceptable state); meanwhile, the unified access platform process of the signal control environment is activated, so that the unified access platform process of the signal control environment is switched from an IDLE state to an ACTIVE state (namely, changing from a service unacceptable state to a service acceptable state), that is, realizing switch of the unified access platform process between activated state and nonactivated state; and then the unified access platform process and the charging engine process of the charging environment are stopped. In this way, a seamless switch may be realized, and external operation is not interrupted at all. At this moment, update of the original table performed by the signal control environment is a virtual operation; and when the signal control environment detects an operation of accessing the original table, Table_tariff, the operation is automatically transposed to an operation of accessing the table Table_tariff_SnapShot, and a debt record file is normally outputted for a charging result of the signal control environment (since a catalog is modified, the debt record file will not be mixed together with a debt record file of a normal charging environment). As the operation performed by the signal control environment on the data center belongs to virtual operation, and balance is not actually modified, thus the outputted debt record file is substantially a bypass debt record file rather than corresponding to a charging result. From stop of a charging environment process and start of a signal control environment process, the system switching from the online charging phase into the real-time signal control phase (since an external port is not changed, processing of the system is coherent, and outer network element does not perceive the change of the system switching between the online charging phase and the real-time signal control phase). At this moment, the charging environment may be upgraded, and a software packet is upgraded and updated (including incompatible upgrade of the table Table_tariff).

In an upgrade termination phase, the charging engine process of the charging environment is firstly started (since a corresponding unified access platform process is not started, there is no request that will trigger the charging engine process, and the charging engine process of the charging environment is temporarily idle), and then the unified access platform process of the charging environment is started without being activated. After the aforementioned start is completed, the unified access platform process of the signal control environment is deactivated, so that the unified access platform process of the signal control environment is switched from an ACTIVE state to an IDLE state (namely, changing from a service acceptable state to a service unacceptable state); meanwhile, a unified access platform process of the charging environment is activated, so that the unified access platform process of the charging environment is switched from an IDLE state to an ACTIVE state (namely, changing from a service unacceptable state to a service acceptable state), that is, realizing switch of the unified access platform process between activated state and nonactivated state; and then the unified access platform process and the charging engine process of the signal control environment are stopped. In this way, a seamless switch may be realized, and external operation is not interrupted at all. If a charging debt record file is generated at the real-time signal control phase, offline charging is performed to the charging debt record file generated at the real-time signal control phase (since it is a virtual operation, the file is substantially a bypass file), and the signal control system is cleared (a software packet, a temporary table, a user and the like are deleted, and at the end, signal control user environment and the table Table_tariff_SnapShot are cleared).

Figure 7:
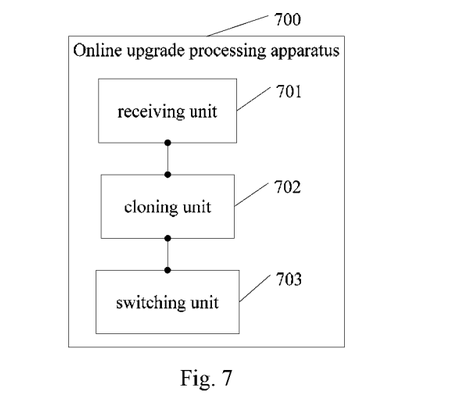
FIG. 7 is a structural schematic view of an embodiment of an online upgrade processing apparatus provided by the present invention.

An online upgrade processing apparatus in an embodiment of the present invention is described below. Referring to FIG. 7, the online upgrade processing apparatus 700 in the embodiment of the present invention includes the following units:

a receiving unit 701, configured to receive online upgrade indication information, wherein the online upgrade indication information is used for indicating that a charging system enters into an online upgrade preparation phase;

a cloning unit 702, configured to simulate charging environment of the charging system to generate a signal control environment with a charging function; and a switching unit 703, configured to utilize the signal control environment to replace the charging environment to accept service when the charging system enters into an online upgrading phase.

Further, the cloning unit 702 includes at least one of a snapshotting module, a signal control increment module and a signal control replacement module, wherein the aforementioned snapshotting module is configured to obtain a mirror table identical to an original table by snapshotting based on the original table in the aforementioned charging environment, so that processing of access to the original table is automatically transposed to access to the mirror table in the signal control environment. The aforementioned signal control increment module is configured to design a signal control increment table which has same structure and index as an original table, so that changed data is stored in the signal control increment table in an incremental manner when data of the original table is changed during charging in the signal control environment. The aforementioned signal control replacement module is configured to design a signal control replacement table which has same structure and index as an original table, so that changed data is stored in the signal control replacement table in a replacement manner when data of the original table is changed during charging in the signal control environment.

Figure 8:
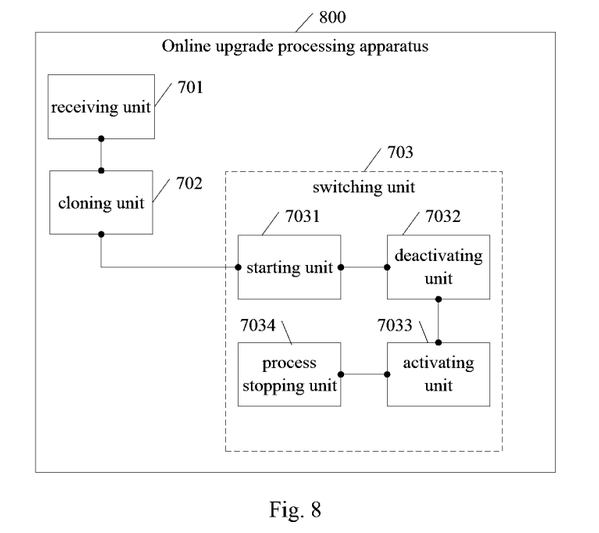
FIG. 8 is a structural schematic view of another embodiment of the online upgrade processing apparatus provided by the present invention.

Specifically, based on the embodiment shown in FIG. 7, in an online upgrade processing apparatus 800 shown in FIG. 8, the switching unit 703 may include:

a starting unit 7031, configured to start but not activate the above-mentioned signal control environment, so that the above-mentioned signal control environment is in a service unacceptable state;

a deactivating unit 7032, configured to deactivate a unified access platform process of the above-mentioned charging environment, so that the above-mentioned charging environment is in a service unacceptable state;

an activating unit 7033, configured to activate the above-mentioned signal control environment, so that the signal control environment is in a service acceptable state; and a process stopping unit 7034, configured to stop the unified access platform process and a charging engine process of the above-mentioned charging environment.

Furthermore, in an application scenario, based on the embodiment shown in FIG. 7 or FIG. 8, the switching unit 703 is further configured to recover the above-mentioned charging environment to accept service after the online upgrade is terminated. The switching unit 703 may include the following units: a starting unit, configured to start but not activate a unified access platform process of the above-mentioned charging environment after the online upgrade is terminated, so that the unified access platform process of the above-mentioned charging environment is in a service unacceptable state; a deactivating unit, configured to deactivate, after the online upgrade is terminated, a unified access platform process of the above-mentioned signal control environment, so that the above-mentioned signal control environment is in a service unacceptable state; an activating unit, configured to activate the unified access platform process of the above-mentioned charging environment after the online upgrade is terminated, so that the above-mentioned charging environment is in a service acceptable state; and a process stopping unit, configured to stop the unified access platform process and a charging engine process of the above-mentioned signal control environment. A connection relationship among the starting unit, the deactivating unit, the activating unit and the process stopping unit in the present application scenario may be referred to the connection relationship among the starting unit 7031, the deactivating unit 7032, the activating unit 7033 and the process stopping unit 7034 in the embodiment shown in FIG. 8. Or, a function realized by the aforementioned starting unit in the present application scenario may be a extension on the basis of the starting unit 7031 in the embodiment shown in FIG. 8, and similarly, functions realized by the aforementioned deactivating unit, activating unit and the process stopping unit in the present application scenario may be extensions on the basis of the deactivating unit 7032, the activating unit 7033 and the process stopping unit 7034, respectively. No limitation is set herein.

Figure 9:
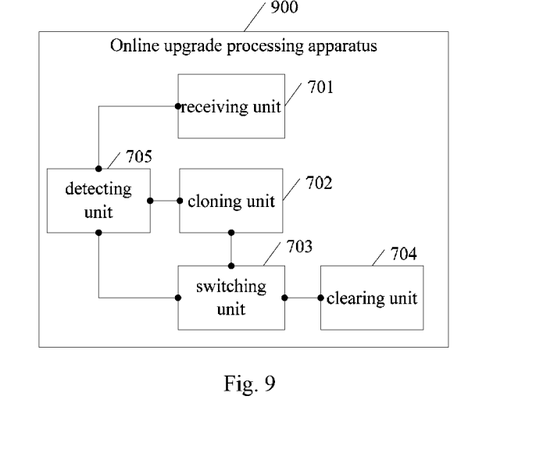
FIG. 9 is a structural schematic view of yet another embodiment of the online upgrade processing apparatus provided by the present invention.

Further, based on the online upgrade processing apparatus 700 in the embodiment shown in FIG. 7, the online upgrade processing apparatus may further include a clearing unit, and the clearing unit is configured to clear the aforementioned signal control environment. The clearing unit 704 in an online upgrade processing apparatus 900 is shown in FIG. 9. Furthermore, as shown in FIG. 9, the online upgrade processing apparatus 900 may further include a detecting unit 705, configured to detect, before the cloning unit executes an operation and when the signal control environment exists currently, whether a version of the signal control environment is in accordance with a version of the charging environment; and the cloning unit 702 is triggered when a detection result of the above-mentioned detecting unit is that the version of the signal control environment is not in accordance with the version of the charging environment.

It should be noted that, the online upgrade processing apparatus 700, the online upgrade processing apparatus 800 and the online upgrade processing apparatus 900 in the embodiments of the present invention may be the online upgrade processing apparatus in the aforementioned embodiments of the methods, and may be used for realizing all the technical solutions in the aforementioned embodiments of the methods. Functions of the respective functional modules of the above-mentioned apparatuses may be specifically realized according to the method in the aforementioned embodiments of the methods, specific implementation procedure of which may be referred to related description in the aforementioned embodiments, and will not be described repeatedly herein.

It can thus be seen from the foregoing that, in the embodiment of the present invention, the online upgrade processing apparatus generates, when online upgrade is prepared, the signal control environment with the charging environment function by simulating the charging environment, and utilizes the signal control environment to replace the charging environment to accept service in the online upgrade process. As a result, on one hand, the solution solves a dilemma that it is necessary to bypass service during the online upgrade, thereby avoiding an arrearage risk caused by bypassing the service; on the other hand, since the technical solution in the embodiment of the present invention does not need to modifying the architecture of the charging system or modifying an outer network element, thus having a characteristic of low modification cost.

A charging system in the embodiment of the present invention is described below. The charging system includes:

an online upgrade processing apparatus, configured to receive online upgrade indication information, wherein the online upgrade indication information is used for indicating that a charging system enters into an online upgrade preparation phase; to simulate charging environment of the charging system to generate a signal control environment with a charging function when the online upgrade indication information is received; and to utilize the signal control environment to replace the charging environment to accept service when the charging system enters into an online upgrading phase when the charging system enters into an online upgrading phase.

It should be noted that, the online upgrade processing apparatus in the embodiment of the present invention may be the one in the embodiments shown in FIG. 7, FIG. 8 and FIG. 9 mentioned above, and may be used for realizing all the technical solutions in the aforementioned embodiments of the apparatus, specific implementation procedure of which may be referred to related description in the aforementioned embodiments, and will not be described repeatedly herein.

It can thus be seen from the foregoing that, in the embodiment of the present invention, the online upgrade processing apparatus generates, when online upgrade is prepared, the signal control environment with the charging environment function by simulating the charging environment, and utilizes the signal control environment to replace the charging environment to accept service in the online upgrade process. As a result, on one hand, the solution solves a dilemma that it is necessary to bypass service during the online upgrade, thereby avoiding an arrearage risk caused by bypassing the service; on the other hand, since the technical solution in the embodiment of the present invention does not need to modifying the architecture of the charging system or modifying an outer network element, thus having a characteristic of low modification cost.

It should be clearly appreciated for those of ordinary skill in the art that, for the purpose of convenience and brevity in description, specific working processes of the above-described apparatuses and units may be referred to corresponding processes in the aforementioned embodiments of the methods, which will not be described redundantly herein.

In several embodiments provided by the present application, it should be understood that the disclosed apparatuses and methods may be realized in other manner. For example, the above-described embodiments of apparatuses are merely exemplary, for example, division of the units is only a division of logic function, other division manner may be adopted in practice, e.g., multiple units or components may be combined or integrated in another system, or some characteristics may be omitted or not be executed. From another point of view, displayed or discussed mutual coupling or direct coupling or communication connection may be indirect coupling or communication connection of apparatuses or units through some interfaces, and may be in an electrical, mechanical or other form.

The units illustrated as separate components may be or may not be physically separated, and the component displayed as a unit may be or may not be a physical unit, that is to say, the component may be positioned at one place, or may be distributed on multiple network units. Objective of the solution of the present embodiment may be fulfilled by selecting part of, or all of, the units according to actual needs.

In addition, in various embodiments of the present invention, the respective functional units may be integrated in one processing unit, or the respective functional units may physically exist separately, or two or more units may be integrated in one unit. The aforementioned integrated unit may be realized in a form of hardware, or may be realized in a form of a software functional unit.

When the integrated unit is realized in the form of a software functional unit, and is sold or used as an independent product, the integrated unit may be stored in a computer-readable storage medium. Based on such an understanding, the technical solution of the present invention substantially, or the part of the present invention making contribution to the prior art, or, all or part of the technical solution, may be embodied in a form of a software product, and the computer software product is stored in a storage medium, which includes multiple instructions enabling one computer equipment (which may be a personal computer, a server, a network device or the like) to execute all or part of the steps in the methods of the embodiments of the present invention. The aforementioned storage medium includes: various media capable of storing program codes, such as a U disk, a mobile hard disk, a read-only memory (ROM), a random access memory (RAM), a disk, an optical disk or the like.

The online upgrade processing method, the associated apparatus and the system provided in the present invention are introduced in details above. For those of ordinary skill in the art, modifications will be made on both the technical solutions disclosed in the specific embodiments and application scope according to the conception of the embodiments of the present invention. In conclusion, the contents of the present specification should not be understood as limitation to the present invention.

What is claimed is:

1. An online upgrade processing method, comprising:
receiving, by an online upgrade processor, online upgrade indication information, wherein the online upgrade indication information indicates that a charging system enters into an online upgrade preparation phase;
simulating, by the online upgrade processor, charging environment of the charging system to generate a signal control environment with a charging function when the online upgrade indication information is received, wherein both the charging environment and the signal control environment comprise information and resources required to be used in a charging process; and
utilizing, by the online upgrade processor, the signal control environment to replace the charging environment to accept service when the charging system enters into an online upgrading phase;
wherein
the utilizing the signal control environment to replace the charging environment to accept the service comprises:
starting, by the online upgrade processor, but not activating the signal control environment, so that the signal control environment is in a service unacceptable state;
deactivating, by the online upgrade processor, after the signal control environment is started, a unified access platform process of the charging environment, so that the charging environment is in the service unacceptable state;
activating, by the online upgrade processor, after the unified access platform process of the charging environment is deactivated, the signal control environment, so that the signal control environment is in a service acceptable state; and
terminating, by the online upgrade processor, after the signal control environment is activated, the unified access platform process and a charging engine process of the charging environment.

2. The method of claim 1, wherein
the simulating the charging environment to generate the signal control environment with the charging function comprises:
obtaining, by the online upgrade processor, a minor table identical to an original table by snapshotting based on the original table in the charging environment, so that processing of access to the original table is automatically transposed to access to the minor table in the signal control environment.

3. The method of claim 1, wherein
the simulating the charging environment to generate the signal control environment with the charging function comprises:
designing, by the online upgrade processor, a signal control increment table which has a same structure and index as an original table, so that changed data is stored in the signal control increment table in an incremental manner when data of the original table is changed during charging in the signal control environment.

4. The method of claim 1, wherein
the simulating the charging environment to generate the signal control environment with the charging function comprises:
designing, by the online upgrade processor, a signal control replacement table which has a same structure and index as an original table, so that changed data is stored in the signal control replacement table in a replacement manner when data of the original table is changed during charging in the signal control environment.

5. The method of claim 1, wherein
before simulating the charging environment, the method further comprises:

detecting, by the online upgrade processor, if the signal control environment currently exists, whether a version of the signal control environment is in accordance with a version of the charging environment;

directly executing, by the online upgrade processor, if the version of the signal control environment is in accordance with the version of the charging environment, the utilizing the signal control environment to replace the charging environment to accept the service; and if the version of the signal control environment is not in accordance with the version of the charging environment, executing, by the online upgrade processor, the simulating the charging environment to generate the signal control environment with the charging function and the utilizing the signal control environment to replace the charging environment to accept the service.

6. The method of claim 1, wherein the starting but not activating the signal control environment comprises:

starting and activating, by the online upgrade processor, a charging engine process of the signal control environment; and starting but not activating, by the online upgrade processor, after the charging engine process is started, a unified access platform process of the signal control environment; and wherein the activating the signal control environment comprises:

activating, by the online upgrade processor, the unified access platform process of the signal control environment.

7. The method of claim 1, wherein after utilizing the signal control environment to replace the charging environment to accept the service, the method further comprises:

recovering, by the online upgrade processor, the charging environment to accept the service when an online upgrade is terminated.

8. The method of claim 7, wherein the recovering the charging environment to accept the service comprises:

starting, by the online upgrade processor, a charging engine process of the charging environment;

starting but not activating, by the online upgrade processor, after the charging engine process is started, a unified access platform process of the charging environment, so that the unified access platform process of the charging environment is in a service unacceptable state;

deactivating, by the online upgrade processor, after the unified access platform process of the charging environment is started, a unified access platform process of the signal control environment, so that the signal control environment is in the service unacceptable state;

activating, by the online upgrade processor, after the unified access platform process of the signal control environment is deactivated, the unified access platform process of the charging environment, so that the charging environment is in a service acceptable state; and terminating, by the online upgrade processor, after the unified access platform process of the charging environment is activated, the unified access platform process and a charging engine process of the signal control environment.

9. The method of claim 8, wherein after stopping the unified access platform process and the charging engine process of the signal control environment, further comprising:

clearing, by the online upgrade processor, the signal control environment.

10. An online upgrade processing apparatus, comprising:

a receiver, configured to receive online upgrade indication information, wherein the online upgrade indication information indicates that a charging system enters into an online upgrade preparation phase;

a processor, configured to simulate charging environment of the charging system to generate a signal control environment with a charging function, wherein both the charging environment and the signal control environment comprise information and resources required to be used in a charging process; and utilize the signal control environment to replace the charging environment to accept service when the charging system enters into an online upgrading phase;

wherein when utilizing the signal control environment, the processor is further configured to:

start but not activate the signal control environment, so that the signal control environment is in a service unacceptable state;

deactivate a unified access platform process of the charging environment, so that the charging environment is in the service unacceptable state;

activate the signal control environment, so that the signal control environment is in a service acceptable state; and stop the unified access platform process and a charging engine process of the charging environment.

11. The apparatus of claim 10, wherein the processor is configured to obtain a minor table identical to an original table by snapshotting based on the original table in the charging environment, so that processing of access to the original table is automatically transposed to access to the minor table in the signal control environment.

12. The apparatus of claim 10, wherein the processor is configured to design a signal control increment table which has a same structure and index as an original table, so that changed data is stored in the signal control increment table in an incremental manner when data of the original table is changed during charging in the signal control environment.

13. The apparatus of claim 10, wherein the processor is configured to design a signal control replacement table which has a same structure and index as an original table, so that changed data is stored in the signal control replacement table in a replacement manner when data of the original table is changed during charging in the signal control environment.

14. The apparatus of claim 10, wherein the processor is configured to detect, before the processor executes an operation and when the signal control environment exists currently, whether a version of the signal control environment is in accordance with a version of the charging environment; and the processor is configured to simulate charging environment of the charging system to generate a signal control environment with a charging function, when a detection result of the processor is that the version of the signal control environment is not in accordance with the version of the charging environment.

15. The apparatus of claim 10, wherein the processor is further configured to recover the charging environment to accept service when the online upgrade is terminated.

16. The apparatus of claim 15, wherein the processor is configured to start, after the online upgrade is terminated, a charging engine process of the charging environment, and start but not activate a unified access platform process of the charging environment, so that the unified access platform process of the charging environment is in a service unacceptable state;

deactivate, after the online upgrade is terminated, a unified access platform process of the signal control environment, so that the signal control environment is in the service unacceptable state;

activate the unified access platform process of the charging environment after the online upgrade is terminated, so that the charging environment is in a service acceptable state; and     stop the unified access platform process and a charging engine process of the signal control environment after the online upgrade is terminated.

17. The apparatus of claim 16, wherein
the processor is configured to clear the signal control environment.

18. A charging system, comprising:
an online upgrade processing apparatus and a potential upgrade charging system, wherein the online upgrade processing apparatus comprises.
a receiver, configured to receive online upgrade indication information, wherein the online upgrade indication information indicates that a charging system enters into an online upgrade preparation phase;

a processor, configured:
to simulate charging environment of the charging system to generate a signal control environment with a charging function when the online upgrade indication information is received, wherein both the charging environment and the signal control environment comprise information and resources required to be used in a charging process; and to utilize the signal control environment to replace the charging environment to accept service when the charging system enters into an online upgrading phase when the charging system enters into an online upgrading phase;

wherein when utilizing the signal control environment, the processor is further configured to:

start but not activate the signal control environment, so that the signal control environment is in a service unacceptable state;

deactivate a unified access platform process of the charging environment, so that the charging environment is in the service unacceptable state;

activate the signal control environment, so that the signal control environment is in a service acceptable state; and stop the unified access platform process and a charging engine process of the charging environment.

\* \* \* \* \*

UNITED STATES PATENT AND TRADEMARK OFFICE
CERTIFICATE OF CORRECTION

PATENT NO. : 9,674,371 B2  
APPLICATION NO. : 14/524480  
DATED : June 6, 2017  
INVENTOR(S) : Lu et al.

Page 1 of 1

It is certified that error appears in the above-identified patent and that said Letters Patent is hereby corrected as shown below:

In the Claims

Column 20, Line 38, "a minor table" should read -- a mirror table --.

Column 20, Line 42, "a minor table" should read -- a mirror table --.

Column 22, Line 30, "a minor table" should read -- a mirror table --.

Column 22, Line 34, "a minor table" should read -- a mirror table --.

Signed and Sealed this  
Twenty-sixth Day of December, 2017

Joseph Matal  
*Performing the Functions and Duties of the  
Under Secretary of Commerce for Intellectual Property and  
Director of the United States Patent and Trademark Office*